US012795043B2

(12) United States Patent
Baek

(10) Patent No.: US 12,795,043 B2
(45) Date of Patent: Nov. 10, 2026

(54) VIDEO RECORDING SYSTEM FOR VEHICLE AND METHOD OF CONTROLLING THE SAME

(71) Applicants: HYUNDAI MOTOR COMPANY, Seoul (KR); KIA CORPORATION, Seoul (KR)

(72) Inventor: Joo Am Baek, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/957,030

(22) Filed: Nov. 22, 2024

(65) Prior Publication Data

US 2025/0385983 A1 Dec. 18, 2025

(30) Foreign Application Priority Data

Jun. 14, 2024 (KR) ........................ 10-2024-0077547

(51) Int. Cl.
*H04N 5/77* (2006.01)
*H04N 7/18* (2006.01)

(52) U.S. Cl.
CPC ................. *H04N 5/77* (2013.01); *H04N 7/18* (2013.01)

(58) Field of Classification Search
None
See application file for complete search history.

(56) References Cited

U.S. PATENT DOCUMENTS

2016/0129883 A1* 5/2016 Penilla .................. B60R 25/305 348/148
2017/0080898 A1* 3/2017 Cogill ...................... B60R 25/30
2019/0147611 A1* 5/2019 Shinnishi ......... G08B 13/19604 382/103
2023/0373437 A1* 11/2023 Baruco ................. B60R 25/305
2025/0067864 A1* 2/2025 Velusamy .............. H04N 7/188

* cited by examiner

*Primary Examiner* — Heather R Jones
(74) *Attorney, Agent, or Firm* — MCDONNELL BOEHNEN HULBERT & BERGHOFF LLP

(57) ABSTRACT

Disclosed is a video recording device including a camera module configured to acquire a video of the surroundings of a vehicle, a motion detection sensor configured to detect a motion of a nearby object, a first memory configured to store the video, and a controller configured to control the storing of the video and including a second memory configured to store a computer program for storing the video and a processor configured to execute the computer program, wherein, when the computer program is executed by the processor, the controller is configured to determine whether to store the video based on mobile key detection and motion detection.

18 Claims, 5 Drawing Sheets

VIDEO RECORDING SYSTEM FOR VEHICLE AND METHOD OF CONTROLLING THE SAME

CROSS-REFERENCE TO RELATED APPLICATION(S)

This application claims the benefit of Korean Patent Application No. 10-2024-0077547, filed on Jun. 14, 2024, which is hereby incorporated by reference as if fully set forth herein.

TECHNICAL FIELD

The present disclosure relates to a video recording device for a vehicle and a method of controlling the video recording device.

BACKGROUND

A video recording device refers to a device configured to record videos or images of, for example, situations where a vehicle is traveling or parked.

A video recording device for a vehicle may generally be referred to as a driving video recording device because it is intended mainly to acquire videos or images of an accident or the like that may occur while the vehicle is traveling.

To acquire videos or images, the video recording device may include a controller, a memory for storing videos or images, and a camera for capturing and recording videos or images.

In general, the video recording device may store a video of the surroundings of a vehicle while the vehicle is traveling, along with data on driving of the vehicle at a time corresponding to the video and, when the occurrence of a set event is detected even while the vehicle is parked, record a video according to the already input settings.

The video recording device for a vehicle, also referred to as a black box (or a dash camera), was initially provided (e.g., only) as an external device, but has recently been embedded and provided as a built-in device in a vehicle before the vehicle is released from a factory.

Video recording in a parked state where a vehicle is parked may include always-on recording that performs recording continuously while the vehicle is parked (which may also be referred to herein as "always-on parking recording"), depending on what is selected by a user, in addition to event-based recording (or simply "event recording").

In this case, the recording time of the always-on parking recording may change depending on the state of a battery, and it may not meet a consumer demand for long-time recording.

Therefore, an alternative that may fulfill this consumer demand would be beneficial.

SUMMARY

An object of the present disclosure is to solve at least one of the issues described above.

An object of the present disclosure is to provide a method of increasing an available recording time in a parked state.

An object of the present disclosure is to provide a method of detecting, in advance, a situation that benefits from (e.g., highly requires) recording in a parked state and performing the recording.

An object of the present disclosure is to provide a method of determining whether it is beneficial (e.g., a need) for recording based on a motion detected around a vehicle.

An object of the present disclosure is to provide a method of effectively processing a motion detected from a driver when detecting a motion around a vehicle, thereby enabling efficient system operation.

An object of the present disclosure is to provide a method of reducing the time a controller is frequently turned on or off and the time the controller is in a wake-up state due to a motion detected by a driver boarding and alighting.

According to at least one embodiment of the present disclosure, there is provided a video recording device including a camera module configured to acquire a video of the surroundings of a vehicle, a motion detection sensor configured to detect a motion of a nearby object, a first memory configured to store the video, and a controller configured to control the storing of the video. The controller may include a second memory configured to store a computer program for storing the video, and a processor configured to execute the computer program, wherein, when the computer program is executed by the processor, the controller may be configured to determine whether to store the video based on mobile key detection and motion detection.

According to at least one embodiment, the determining whether to store the video may include, when a mobile key is detected, determining whether to store the video based on the number of objects from which a motion is detected.

According to at least one embodiment, the determining whether to store the video based on the number of the objects may include, in response to the number being determined to be 1, determining not to store the video.

According to at least one embodiment, the determining whether to store the video based on the number of the objects may further include tracking the objects.

According to at least one embodiment, the determining whether to store the video based on the number of the objects may further include, in response to the number being determined to be plural, determining whether to store the video based on a velocity of another object different from an object corresponding to the mobile key.

According to at least one embodiment, the determining whether to store the video based on the velocity of the other object may further include, in response to an absolute value of the velocity being less than or equal to a threshold value, determining to store the video.

According to at least one embodiment, the determining whether to store the video based on the velocity of the other object may further include, in response to the velocity being greater than the threshold value and being in a direction receding farther from the vehicle, determining not to store the video.

According to at least one embodiment, the determining whether to store the video may include determining whether to store the video based on at least one of a position of the mobile key and a position of at least one object from which a motion is detected.

According to at least one embodiment, the determining whether to store the video based on the position may include, in response to the position of the mobile key and the position of the at least one object being determined to be the same, determining whether to store the video based on the number of the at least one object.

According to at least one embodiment, the determining whether to store the video based on the number of the at least one object may include, in response to the number being determined to be 1, determining not to store the video.

According to at least one embodiment, the determining whether to store the video based on the number of the at least one object may further include, in response to the number being determined to be plural, determining whether to store the video based on a velocity of another object different from the object corresponding to the mobile key.

According to at least one embodiment, the determining whether to store the video based on the velocity of the other object may further include, in response to an absolute value of the velocity being less than or equal to a threshold value, determining to store the video.

According to at least one embodiment, the determining whether to store the video based on the velocity of the other object may further include, in response to the velocity being greater than the threshold value and being in a direction receding farther from the vehicle, determining not to store the video.

According to at least one embodiment, the determining whether to store the video based on the position may include, in response to the position of the at least one object being determined to be present and the position of the mobile key being determined to be absent, determining to store the video.

According to at least one embodiment, the determining whether to store the video based on the position may include, in response to the position of the at least one object being determined to be absent and the position of the mobile key being determined to be present, determining whether the position of the mobile key is present in a set area.

According to at least one embodiment, the determining whether to store the video based on the position may further include, in response to the position of the mobile key being determined not to be present in the set area, determining not to store the video.

According to at least one embodiment, the determining whether to store the video based on the position may further include, in response to the position of the mobile key being determined to be present in the set area, determining to record a video using a surround view monitor (SVM) camera and store the video.

According to at least one embodiment, the determining whether to store the video based on the position may further include, in response to the position of the mobile key being moved to be outside the set area within a set time, determining not to store the video.

According to at least one embodiment, the determining whether to store the video based on the position may further include, in response to the position of the mobile key not being moved to be outside the set area within the set time, determining to store the video.

According to at least one embodiment of the present disclosure, there is provided a method of controlling a video recording device including a camera module configured to acquire a video of the surroundings of a vehicle, a motion detection sensor configured to detect a motion of a nearby object, a first memory configured to store the video, and a controller including a second memory configured to store a computer program for storing the video and a processor configured to execute the computer program. When the computer program is executed by the processor, the controller may be configured to determine whether to store the video based on mobile key detection and motion detection.

According to embodiments of the present disclosure described herein, an available recording time in a parked state may be increased.

Further, according to embodiments of the present disclosure described herein, a situation for which recording is beneficial (e.g., highly needed) in a parked state may be detected in advance, and the recording may be performed accordingly.

Further, according to embodiments of the present disclosure described herein, a motion detected from a driver may be (e.g., effectively) processed when detecting a motion around a vehicle, and thus efficient system operations may be enabled.

Further, according to embodiments of the present disclosure described herein, the time a controller is frequently turned on or off and the time the controller is in a wake-up state due to a motion detected by a driver boarding and alighting may be reduced.

DETAILED DESCRIPTION

Figure 1:
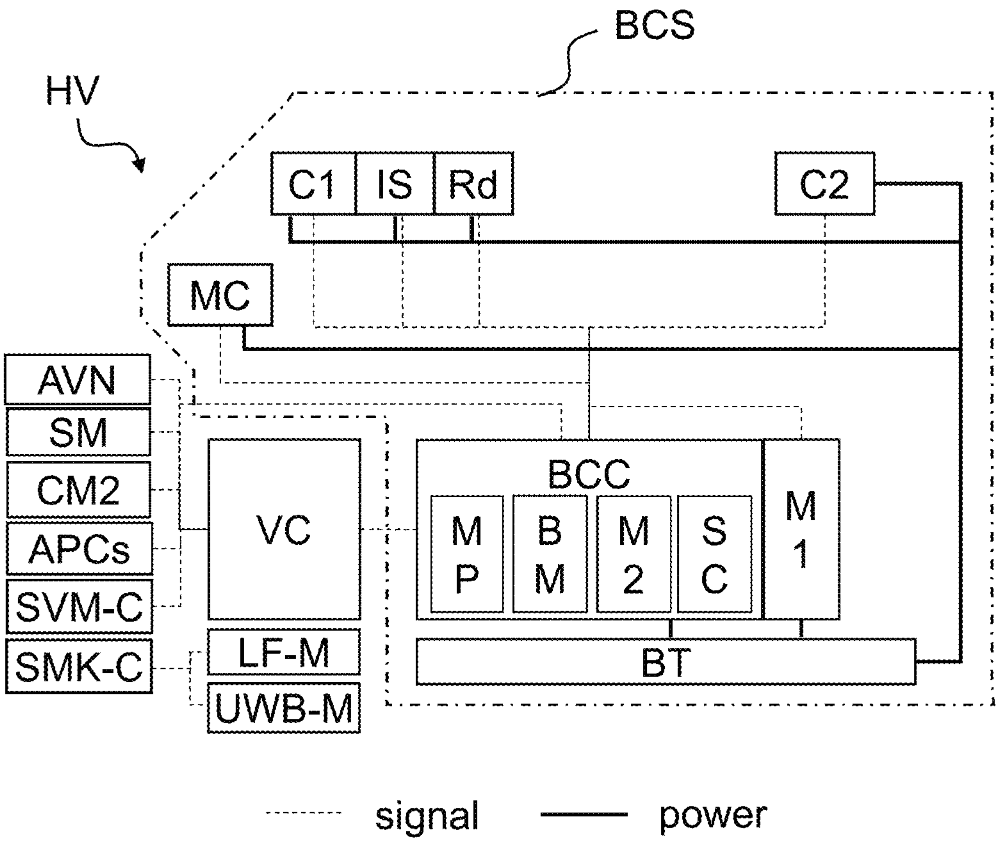
FIG. 1 is a block diagram illustrating a conceptual configuration of a video recording device according to an embodiment of the present disclosure.

Hereinafter, embodiments of the present disclosure will be described in detail with reference to the accompanying drawings. The embodiments are not construed as limited to the disclosure and should be understood to include all changes, equivalents, and replacements within the idea and the technical scope of the disclosure.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

Although terms including ordinal numbers, such as "first," " "second," and the like, may be used herein to describe various elements, the elements are not limited by these terms. These terms are (e.g., only) used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit," "control unit," "control device," or "controller" is merely a widely used term for naming an element that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are (e.g., necessary) for controlling a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), an electronic circuitry, and a logic circuitry.

The processor may be electrically connected to the memory, and the processor may load and record data from the memory. The memory and the processor may be integrated or may be physically separated.

Hereinafter, embodiments of the present disclosure will be described in detail with reference to the accompanying drawings.

Referring to FIG. 1, according to an embodiment of the present disclosure, an embedded driving video recording device, also referred to herein as a built-in camera system (BCS), may be embedded in a host vehicle (HV) and may include a camera module (CM), a first memory (M1), a communication module (CM1), a microphone (MC), an impact sensor (IS), an auxiliary power battery (BT), and a built-in camera controller (BCC).

The driving video recording device of the present disclosure may be embedded but is not necessarily limited thereto.

The camera module CM may include, but is not necessarily limited to, a front camera (C1) and a rear camera (C2). The front camera C1 may be installed to capture an image (also a "video" herein) of a front area before the vehicle HV, and the rear camera C2 may be installed to capture a video of a rear area behind the vehicle HV.

For example, the front camera C1 may be installed at a position on a windshield in a cabin of the vehicle HV near a room mirror, and the rear camera C2 may be installed on a rear window or rear bumper in the cabin of the vehicle HV.

The front camera C1 and the rear camera C2 may support any one of the definitions, for example, high-definition (HD), full HD (FHD), and quad HD (QHD) image quality.

It is to be noted that the front camera C1 and the rear camera C2 do not necessarily provide the same image quality, and a camera of an advanced driver-assistance system (ADAS) of the host vehicle HV may also be used.

In addition, a camera may have an aperture value of F2.0 or less, preferably F1.6 or less. A lower aperture value may allow more light to be gathered, resulting in brighter recordings. In addition, an image tuning technique may be applied to minimize noise and light loss, enabling clear recording even in a dark environment.

The first memory M1 may include any type of storage device in which computer-readable data is stored. For example, it may include at least one of a flash memory, a hard disk memory, a micro type memory, a card type (e.g., an secure digital (SD) or extreme digital (XD)) memory, a random-access memory (RAM), a static RAM (SRAM), a read-only memory (ROM), a programmable ROM (PROM), an electrically erasable PROM (EEPROM), a magnetic RAM (MRAM), a magnetic disk, and an optical disc memory.

In this embodiment, the first memory M1 may be a micro-SD of 64 gigabytes (Gbyte) or more, and may be an external memory. For example, always-on recording while driving (also simply "always-on driving recording" herein) may continue for several hours, and always-on recording while parked (also simply "always-on parking recording" herein) may continue for tens of hours. In addition, event recording based on impact detection may be performed tens of times. The event recording may include impact occurrence-based recording while driving (also simply "driving impact recording" herein) and impact occurrence-based recording while parked (also simply "parking impact recording" herein). In this case, whether the host vehicle HV is in a driving mode or a parking mode may be determined. For example, the driving mode may be determined when a vehicle start switch is in an ignition-on state (e.g., "IGN ON") and otherwise, the parking mode may be determined.

A user may pull out an SD card and connect it to a desktop computer or the like to readily check the contents stored in the card.

In this case, the user may check status information of the SD card through a connected car service (CCS), and may also check when to replace the SD card based on a state of a memory.

The microphone MC may support voice recording. When recording a driving video of the vehicle HV, voice may be recorded in addition to the video.

The impact sensor IS may sense an external impact and may be, for example, a uniaxial or triaxial acceleration sensor.

Although the impact sensor IS dedicated to the built-in camera system BCS may be used, it is to be noted that an acceleration sensor installed in the host vehicle HV may also be used.

A signal from the impact sensor IS may serve as a reference based on which the event recording is started, which will be described later, and the magnitude of an impact on which the reference is based may be set by the user.

For example, the user may select an impact detection sensitivity which is a reference on which the event recording is based when setting the built-in camera system BCS through a display screen (e.g., an audio-video-navigation (AVN) screen described later) in the vehicle HV.

For example, the impact detection sensitivity may be divided into five levels: level 1 (very insensitive), level 2 (insensitive), level 3 (moderate), level 4 (sensitive), and level 5 (very sensitive).

The built-in camera system BCS may be powered by a battery (e.g., a 12V battery) installed in the vehicle HV.

Although the system may be powered by the battery of the vehicle HV while driving and while parked, there may be an issue of excessive battery consumption of the vehicle HV, and thus the auxiliary power battery BT may be included according to an embodiment of the present disclosure.

In an embodiment, the built-in camera system BCS may be powered by the battery of the vehicle HV while driving. For example, it may receive power, while the vehicle HV is driving, from an alternator in the case of an internal combustion engine vehicle, and receive power from any one of a low-power direct current to direct current (DC/DC) (LDC) converter and a DC/DC converter in the case of an electric vehicle, but may receive power from the auxiliary power battery BT while the vehicle HV is parked.

The auxiliary power battery BT may be charged/discharged according to an operating environment of the vehicle HV, and may provide optimal power for recording while the vehicle HV is parked (e.g., "parking recording") and for wireless software updates (e.g., over-the-air (OTA) software updates).

The auxiliary power battery BT may be charged by the battery of the vehicle HV (e.g., a low-voltage battery or high-voltage battery of an electric vehicle), or by an LDC or alternator.

The built-in camera controller BCC may be a higher-level controller that controls other components of the built-in camera system BCS, and may exchange signals with a vehicle controller VC of the host vehicle HV and/or a communication unit (e.g., a data communication unit DCU), a sensor module (SM), automatic performance controllers (APCs), an AVN system, a surround view monitor (SVM) controller (SVM-C), a smart key system (SMK) controller (SMK-C), or the like. For example, for such a signal exchange, a local interconnect network (LIN) or controller area network (CAN), or Ethernet may be used.

In this case, the communication unit (e.g., the DCU) may support wireless mobile communication, and the wireless mobile communication may include at least one of a global system for mobile communication (GSM), code-division multiple access (CDMA), wideband CDMA (WCDMA), high-speed downlink packet access (HSDPA), long-term evolution (LTE), and 5G. The communication unit (e.g., the DCU) may also support short-range wireless communication in addition to the wireless Internet communication. The short-range wireless communication may include at least one of Bluetooth, radio frequency identification (RFID), infrared data association (IrDA), ultra-wideband (UWB), ZigBee, near-field communication (NFC), and Wi-Fi direct technologies.

In this case, the sensor module SM may include at least one of a speed sensor, an acceleration sensor, a vehicle position sensor (e.g., a global positioning system (GPS) receiver), a steering angle sensor, a yaw rate sensor, a pitch sensor, and a roll sensor, and the APCs may include at least one of a direction indicator controller, a turn signal controller, a wiper controller, an ADAS controller, and an airbag controller. The sensor module SM may also include a vehicle door opening/closing sensor and a seat occupancy sensor.

The built-in camera controller BCC may control the other components to perform always-on driving recording, always-on parking recording, event recording that is performed based on an impact signal from the impact sensor IS, or the like.

During the recording, driving information of the vehicle HV may also be recorded.

In this case, the driving information of the vehicle HV may include time, vehicle speed, gear position, direction indicator information (e.g., turn signal information), impact detection degree (any one of the five levels described above), GPS position, or the like.

Although such vehicle driving information may be received from the vehicle controller VC, it is to be noted that the driving information may also be received directly from corresponding modules or components of the vehicle HV. For example, the vehicle speed may be received directly from the speed sensor of the vehicle HV, the direction indicator information (or the turn signal information from the turn signal controller) may be received directly from the turn signal controller, and the GPS position information may be received from the AVN or GPS receiver.

The event recording may be performed in response to an occurrence of an event detected while the vehicle HV is parked, based on an impact detection sensitivity set by the user, as described above.

During the event recording, the recording may be performed during a period of time from a set time before the event occurs to a set time after the event occurs, and the set times may be selected by the user.

The AVN system may be communicatively connected to the built-in camera controller BCC via the vehicle controller VC or directly connected to the built-in camera controller BCC. The AVN screen may function as a user interface (UI) through which various settings parameters of the built-in camera system BCS are selected by the user.

The built-in camera controller BCC may transmit recorded content to an external server at set intervals, according to what is selected by the user, or upon the occurrence of an event (e.g., a detected impact degree) set by the user.

To perform its functions, the built-in camera controller BCC may include a second memory (M2) and a processor (MP).

For example, the processor MP may include semiconductor integrated circuits and/or electronic elements that perform at least one of comparison, determination, computation, or decision, to achieve programmed functions. For example, the processor MP may be any one or a combination of a computer, a microprocessor (MC), a central processing unit (CPU), an application-specific integrated circuit (ASIC), an electronic circuitry, a logic circuitry, or the like.

The second memory M2 may include any type of storage device in which computer-readable data is stored. For example, it may include at least one of a flash memory, a hard disk memory, a micro-type memory, a card type (e.g., an SD or XD) memory, a RAM, an SRAM, a ROM, a PROM, an EPROM, an MRAM, a magnetic disk, and an optical disc memory.

The second memory M2 may store therein an operating software of the built-in camera controller BCC, and the processor MP may read and execute the software to perform the functions of the built-in camera controller BCC.

The built-in camera controller BCC may also include a buffer memory (BM) for determination, computation, or the like by the processor MP.

The built-in camera controller BCC may also include a supercapacitor (SC). When power is applied to the built-in camera controller BCC, the supercapacitor SC may be charged.

In this case, when power is suddenly blocked due to an impact, damage, or the like, the supercapacitor SC may be used to complete storing a video that is interrupted by the sudden blockage of power.

For example, the supercapacitor SC may have a charging capacity to maintain the power of the built-in camera controller BCC for several seconds to tens of seconds.

In an embodiment, the built-in camera system BCS may include a motion detection sensor.

The motion detection sensor may include, but is not necessarily limited to, a radar (Rd).

The radar Rd may be integrated into the camera module CM. For example, the radar Rd may be integrated and installed in the front camera C1. That is, the front camera C1 may include a radar module.

In an embodiment, motion detection may be performed over a 360-degree omnidirectional area relative to the radar Rd.

It is to be noted that the number of radars Rd for motion detection is not limited to a specific number, and a greater number of radars Rd may be added according to the design.

In an embodiment, a parking recording mode (e.g., an always-on parking recording mode) may be performed by what is selected by the user or default settings for a motion detection function.

For example, in the always-on parking recording mode, the camera module (e.g., C1 and C2), the built-in camera controller BCC, and the like may enter a wake-up state (or an enabled state) from a sleep state (or disabled state) when a motion is detected by the radar RD, and may then acquire and store a corresponding image (or "video" herein).

In this case, the motion detection by the radar Rd may be performed on a set area, which may be modifiable according to the design.

For example, an area ranging from a first set distance to a second set distance relative to the radar Rd (or relative to the vehicle) may be set as a detection area.

In this case, an area within the first set distance may be excluded from the detection area because there may be false detection due to snow or rain near the area or there may be an effect of motion detection associated with an occupant in the vehicle.

In an embodiment, a surround view monitor (SVM) system may include, for example, a front camera, a left camera, a right camera, and a rear camera, in addition to the cameras C1 and C2 dedicated to the built-in camera system BCS described above.

Using images of the four cameras described above, it may support a front wide view, a front top view, and left/right side views.

These view images may be controlled through the SVM-C and output to the AVN screen.

In an embodiment, the SVM-C may communicate with the built-in camera controller BCC via the vehicle controller VC or (e.g., directly) communicate with the built-in camera controller BCC, and may transmit an image or video at the request of the built-in camera controller BCC.

Further, in an embodiment, a mobile key may include a smart key and/or a digital key.

The smart key may be, for example, a fob key, and may typically unlock the doors and/or start the vehicle through, for example, low frequency (LF) and radio frequency (RF) communication.

According to an embodiment, the vehicle may include an LF module (LF-M) for communicating with the smart key, and the LF module LF-M may include, for example, an LF antenna installed on each door handle and a trunk door handle of the vehicle.

Figure 2:
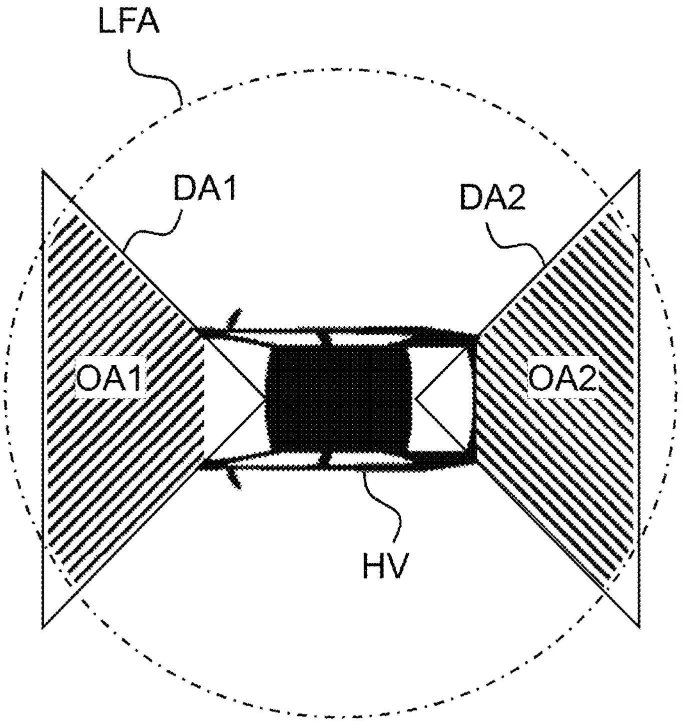
FIG. 2 is a diagram illustrating a radar detection area and an effective low frequency (LF) antenna signal detection area according to an embodiment of the present disclosure.

FIG. 2 is a diagram illustrating a radar detection area (e.g., DA1 and DA2) and an effective LF antenna signal detection area (e.g., LFA) according to an embodiment of the present disclosure.

As shown in FIG. 2, the effective LF antenna signal detection area LFA may include a 360-degree omnidirectional area around the vehicle, and the radar detection area (e.g., DA1 and DA2) may include a front area before the vehicle and a rear area behind the vehicle.

The effective LF antenna signal detection area LFA and the radar detection area (e.g., DA1 and DA2) have an overlapping area (e.g., OA1 and OA2), and based on a detection result from each area, video recording and storage may be performed through a control process described below with reference to FIG. 3.

Hereinafter, the control process will be described in detail with reference to FIG. 3.

First, in step S10, a driver may stop the vehicle at a parking position and select an option for excluding recording a driver boarding/alighting (also a "driver boarding/alighting recording exclusion option") through the settings menu for the built-in camera system BCS.

It is to be noted that, although a driver boarding/alighting recording exclusion function is included as the option, examples are not limited thereto.

In step S10, the driver may also select an always-on parking recording mode and set an impact sensitivity for event recording while the vehicle is parked.

When the parking recording mode is started, the built-in camera controller BCC and the camera module (e.g., C1 and C2) may enter a sleep mode (or disabled mode).

In the sleep mode, the radar Rd may be in an enabled state, and may transmit a wake-up signal when a motion is detected in a detection area and may transmit a corresponding detection signal to the built-in camera controller BCC.

The built-in camera controller BCC may control the built-in camera system BCS to control the camera module (e.g., C1 and C2) to record and store a video according to the detection signal.

A mobile key system (e.g., the SMK-C) may transmit an LF signal through an LF antenna to attempt to recognize a mobile key in step S20, and may receive and process an RF signal transmitted by the mobile key accordingly in step S30.

When receiving the RF signal in step S30 (e.g., Yes in step S30), the mobile key system may transmit corresponding information to the built-in camera controller BCC.

In step S40, the built-in camera controller BCC may receive motion detection information from the radar Rd.

The motion detection information may include an identifier (ID) of each of all objects whose motion is detected and information about the detected motion. The objects may be a pedestrian, a vehicle (e.g. a car, a bus, a truck, a motorcycle, or the like), a bicycle, an animal, or the like.

In step S50, the built-in camera controller BCC may determine the number of detected objects (or the number of IDs) and determine whether the number of IDs exceeds 1.

When the number of IDs is determined to be greater than 1 (e.g., Yes in step S50) in step S50, the built-in camera controller BCC may determine whether another object ID different from the driver possessing the mobile key approaches the host vehicle based on a velocity of the object in step S80.

When it is determined that the other object ID is approaching the vehicle (e.g., Yes in step S80), the built-in camera controller BCC may determine to record and store a video through the camera module (e.g., C1 and C2) in step S90. In this case, when another object, other than the driver, is approaching the vehicle, there may be an act of damaging the vehicle by the object, and thus recording a video may be required.

In contrast, when it is determined that the object is moving away from the vehicle or is stopped (e.g., No in step S80) based on the velocity of the other object ID, this may indicate that the object is not approaching the vehicle, and thus tracking an object ID corresponding to the driver may be performed, and recording a video may not be performed by handling this case as an exception to motion detection-based video recording in steps S60 and S70.

Back in step S50, when the number of IDs is determined to be 1 (e.g., No in step S50), the built-in camera controller BCC may perform steps S60 and S70 as described above.

Alternatively, a digital key may also be used as the mobile key, which will be described in detail below with reference to FIGS. 4 and 5.

Recently, a smartphone has been equipped with ultra-wideband (UWB) communication technology that uses a digital key enabling the smartphone to unlock the doors of a vehicle and start the vehicle.

The UWB technology may use a wide frequency band, several GHz wide, to transmit and receive data, and may be used as accurate and stable real-time positioning technology, unlike other wireless technologies such as Wi-Fi, Bluetooth, and GPS.

Unlike other typical wireless technologies using sine waves, the UWB technology may employ a simple transmission method that uses short pulses, which may reduce power consumption and achieve centimeter-level positioning accuracy.

A UWB may be a pulse waveform that is easy to identify even in a noisy environment, and the UWB pulse used for position information may be characterized by a frequency range of 6.5 to 8 GHz, which does not interfere with wireless communication such as Wi-Fi and Bluetooth.

In an embodiment, to implement the mobile key, the mobile key system may include a UWB module (UWB-M), and the UWB module UWB-M may include UWB chips mounted at five positions in the vehicle (e.g., each of the four doors and the trunk of the vehicle). An example effective UWB signal detection area by the UWB module UWB-M is shown in FIG. 4.

Figure 4:
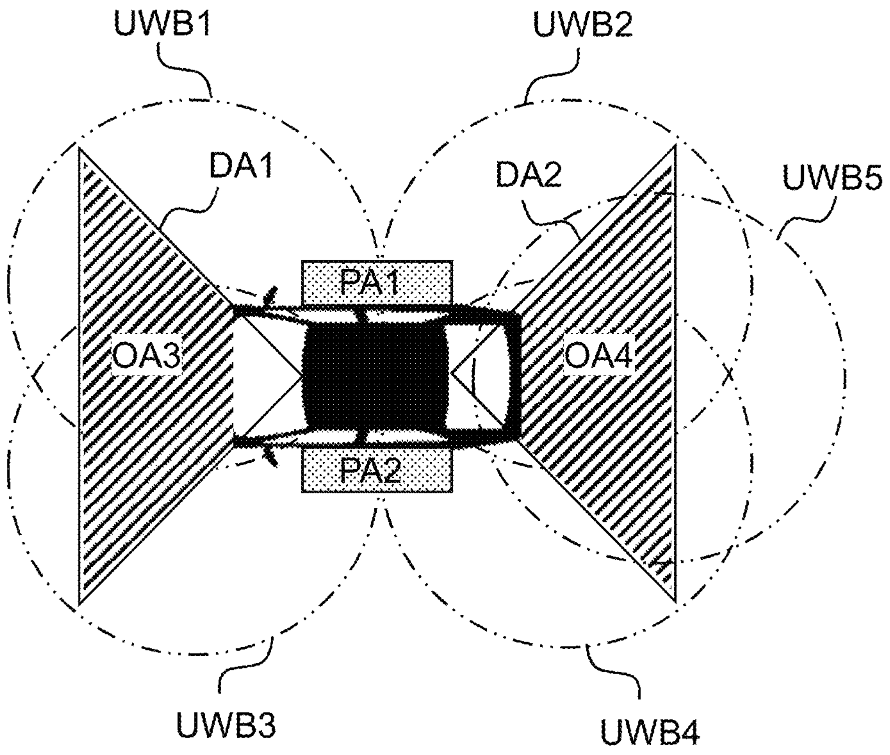
FIG. 4 is a diagram illustrating a radar detection area and an effective ultra-wideband (UWB) signal detection area according to another embodiment of the present disclosure.
Figure 5:
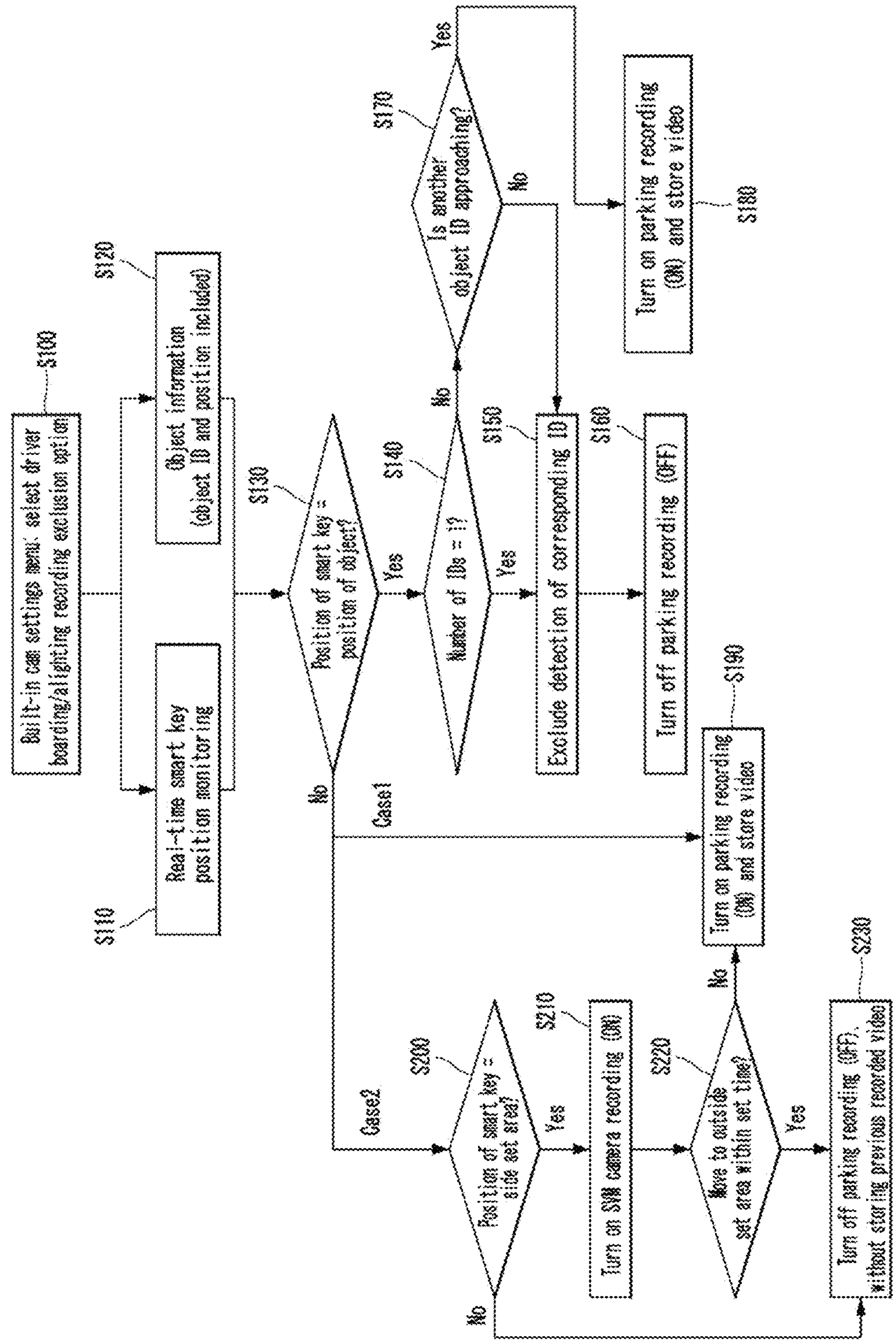
FIG. 5 is a flowchart illustrating a process of controlling a video recording device according to another embodiment of the present disclosure.

Referring to FIG. 4, radar detection areas DA1 and DA2 and effective UWB signal detection areas UWB1 to UWB5 may have overlapping areas OA3 and OA4. In an embodiment, side set areas PA1 and PA2, which are areas (e.g., only) for UWB signals, may be defined on the left and right sides of the vehicle.

Based on a result of detection in the effective UWB signal detection areas UWB1 to UWB5 and the radar detection areas DA1 and DA2, video recording and storage may be performed through a control process described in detail below with reference to FIG. 5.

Figure 3:
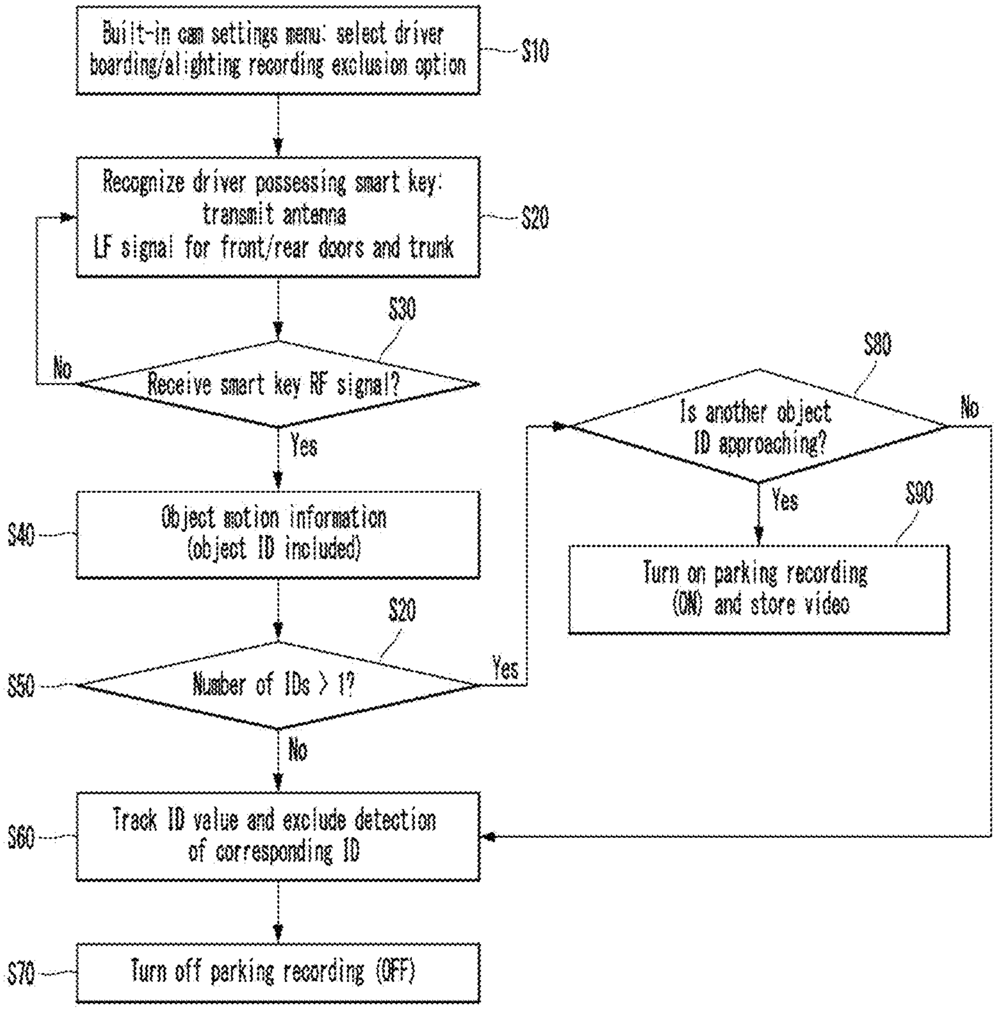
FIG. 3 is a flowchart illustrating a process of controlling a video recording device according to an embodiment of the present disclosure.

Step S100 may be the same as step S10 of FIG. 3, and a detailed description thereof is thus omitted here for brevity.

The mobile key system may transmit a UWB signal to recognize the mobile key and receive a signal transmitted by the smartphone, in step S110.

When receiving the signal from the smartphone in step S110, the mobile key system may transmit information to the built-in camera controller BCC. The information may include position information of the mobile key. The mobile key system may determine a corresponding position (e.g., coordinates) as a result value of UWB positioning, and may transmit the information to the built-in camera controller BCC or another controller in the vehicle (e.g., a body control unit). The other controller in the vehicle may transmit, to the built-in camera controller BCC, the position information or simplified information of the position information (e.g., information about an area on a front right side and a front left side of the vehicle). This information may be compared to position information of an object detected by the radar to determine how they are matched.

Meanwhile, in step S120, motion detection may be performed through the radar Rd, and as a result of the detection, information about objects from which motion is detected may be transmitted to the built-in camera controller BCC. The information about the objects may include an ID and position of each of the objects.

Subsequently, the built-in camera controller BCC may compare the position of the mobile key and a position of a detected object in step S130.

When, as a result of the comparison, the two positions are the same, the built-in camera controller BCC may determine the number of detected objects (or the number of IDs) and determine whether the number of IDs is equal to 1, in step S140.

When the number of IDs is determined not to be 1 (e.g., No in step S140) in step S140, the built-in camera controller BCC may determine whether another object approaches the host vehicle using a velocity of the other object ID besides the driver having the mobile key, in step S170.

In this case, when it is determined that the other object ID is approaching the vehicle (e.g., Yes in step S170), the built-in camera controller BCC may determine to record and store a video through the camera module (e.g., C1 and C2) in step S180. This is because, if an object other than the driver is approaching the vehicle in the vicinity of the vehicle, it is beneficial (e.g., necessary) to record a video because there may be damage to the vehicle by the object.

On the other hand, when it is determined that the velocity of the object ID is in a direction away from the vehicle or is stopped in step S170 (e.g., No of S170), tracking an object ID corresponding to the driver may be performed, and the video recording may not be performed by handling such a case as an exception to motion detection-based video recording in steps S150 and S160.

Back in step S140, when the number of IDs is determined to be 1 (e.g., Yes in step S140), the built-in camera controller BCC may perform steps S150 and S160 as described above.

In addition, when the position of the mobile key and the position of the detected object are not the same in step S130 (e.g., No in step S130), and the detected object is determined to be present but the position of the mobile key is determined to be absent (Case 1), the video recording and storage may be performed in step S190.

In addition, when the position of the mobile key and the position of the detected object are not the same in step S130 (e.g., No in step S130), and the position of the mobile key is determined to be present but the detected object is determined to be absent (Case 2), whether the position of the mobile key is in a set area on the sides of the vehicle may be determined in step S200.

When the position of the mobile key is not within the set area on the sides of the vehicle (e.g., No in step S200) in step S200, the video recording and storage by the camera module (e.g., C1 and C2) may not be performed in step S230.

On the other hand, when it is determined that the position of the mobile key is within the set area on the sides of the vehicle (e.g., Yes in step S200), video recording may be performed using an SVM camera in step S210.

In addition, whether the position of the mobile key is moved to be outside the set area within a set time may be determined in step S220, and when the position is determined not to be moved, the video recording and storage may be performed in step S190. In this case, the video recording may be performed by the camera module (e.g., C1 and C2) or by the SVM camera.

When it is determined that the position of the mobile key is moved to be outside the set area within the set time in step S220, the video recording may be switched to off and a video by the SVM camera may be deleted without being stored in the first memory in step S230.

In a typical always-on parking recording mode, the camera module may substantially continuously acquire a video of the surroundings of the vehicle while the vehicle is parked, and the video may be stored in the first memory M1. Thus, the camera module may be (e.g., substantially continuously) operated to acquire a video while the vehicle is parked, and the built-in camera controller BCC and the first memory M1 may also be (e.g., always) in an operating state to store the video. Therefore, the battery BT may be greatly consumed, which may (e.g., inevitably) limit an available recording time while the vehicle is parked.

However, according to embodiments of the present disclosure described herein, a video may be acquired and stored (e.g., only) when a motion is detected by the radar Rd, and thus the power consumption of the battery BT may be (e.g., greatly) reduced. Therefore, the available recording time while the vehicle is parked may be increased greatly.

Further, according to embodiments of the present disclosure described herein, recording may be performed based on motion detection, but the recording may be performed by separately processing driver motion detection using a mobile key system technology. Thus, effective system operations may be enabled.

What is claimed is:

1. A video recording device, comprising:

a camera module configured to obtain a video of surroundings of a vehicle;

a motion detection sensor configured to detect a motion of at least one nearby object;

a first memory configured to store the video; and a controller configured to control the storing of the video, wherein the controller comprises a second memory storing instructions for storing the video, and a processor configured to execute the instructions, wherein the instructions cause, when executed by the processor, the controller to determine whether to store the video based on detection of a mobile key and the motion detection, and to distinguish, among motion-detected objects, an object corresponding to the mobile key based on a positional relationship between the mobile key and the motion-detected objects, wherein the determining whether to store the video comprises:

when the mobile key is detected, determining whether to store the video based on a number of the motion-detected objects, wherein the determining whether to store the video based on the number of the motion-detected objects comprises:

in response to the number being determined to be 1, determining not to store the video.

2. The video recording device of claim 1, wherein the determining whether to store the video based on the number of the motion-detected objects further comprises tracking the object.

3. The video recording device of claim 1, wherein the determining whether to store the video based on the number of the motion-detected objects further comprises:

in response to the number being determined to be plural, determining whether to store the video based on a velocity of another object different from the object corresponding to the mobile key.

4. The video recording device of claim 3, wherein the determining whether to store the video based on the velocity of the other object further comprises:

in response to an absolute value of the velocity being less than or equal to a threshold value, determining to store the video.

5. The video recording device of claim 4, wherein the determining whether to store the video based on the velocity of the other object further comprises:

in response to the velocity being greater than the threshold value and being in a direction receding farther from the vehicle, determining not to store the video.

6. The video recording device of claim 1, wherein the determining whether to store the video comprises determining whether to store the video based on at least one of a position of the mobile key and a position of at least one motion-detected object.

7. The video recording device of claim 6, wherein the determining whether to store the video based on the position comprises:

in response to the position of the mobile key and the position of the at least one motion-detected object being determined to be the same, determining whether to store the video based on a number of the at least one motion-detected object.

8. The video recording device of claim 7, wherein the determining whether to store the video based on the number of the at least one motion-detected object comprises:

in response to the number being determined to be 1, determining not to store the video.

9. The video recording device of claim 8, wherein the determining whether to store the video based on the number of the at least one motion-detected object further comprises:

in response to the number being determined to be plural, determining whether to store the video based on a velocity of another object different from the object corresponding to the mobile key.

10. The video recording device of claim 9, wherein the determining whether to store the video based on the velocity of the other object further comprises:

in response to an absolute value of the velocity being less than or equal to a threshold value, determining to store the video.

11. The video recording device of claim 10, wherein the determining whether to store the video based on the velocity of the other object further comprises:

in response to the velocity being greater than the threshold value and being in a direction receding farther from the vehicle, determining not to store the video.

12. The video recording device of claim 6, wherein the determining whether to store the video based on the position comprises:

in response to the position of the at least one motion-detected object being determined to be present and the position of the mobile key being determined to be absent, determining to store the video.

13. The video recording device of claim 6, wherein the determining whether to store the video based on the position comprises:

in response to the position of the at least one motion-detected object being determined to be absent and the position of the mobile key being determined to be present, determining whether the position of the mobile key is present in a set area.

14. The video recording device of claim 13, wherein the determining whether to store the video based on the position further comprises:

in response to the position of the mobile key being determined not to be present in the set area, determining not to store the video.

15. The video recording device of claim 13, wherein the determining whether to store the video based on the position further comprises:

in response to the position of the mobile key being determined to be present in the set area, determining to record a video using a surround view monitor (SVM) camera and store the video.

16. The video recording device of claim 13, wherein the determining whether to store the video based on the position further comprises:

in response to the position of the mobile key being moved outside the set area within a set time, determining not to store the video.

17. The video recording device of claim 13, wherein the determining whether to store the video based on the position further comprises:

in response to the position of the mobile key not being moved outside the set area within a set time, determining to store the video.

18. A method of controlling a video recording device comprising a camera module configured to obtain a video of surroundings of a vehicle, a motion detection sensor configured to detect a motion of at least one nearby object, a first memory configured to store the video, and a controller comprising a second memory storing instructions for storing the video and a processor configured to execute the instructions, the method comprising:

determining whether to store the video based on detection of a mobile key and the motion detection, and distinguishing, among motion-detected objects, a motion object corresponding to the mobile key based on a positional relationship between the mobile key and the motion-detected objects, wherein the determining whether to store the video comprises:

when the mobile key is detected, determining whether to store the video based on a number of the motion-detected objects, wherein the determining whether to store the video based on the number of the motion-detected objects comprises:

in response to the number being determined to be 1, determining not to store the video.

* * * * *